UNITED STATES PATENT OFFICE.

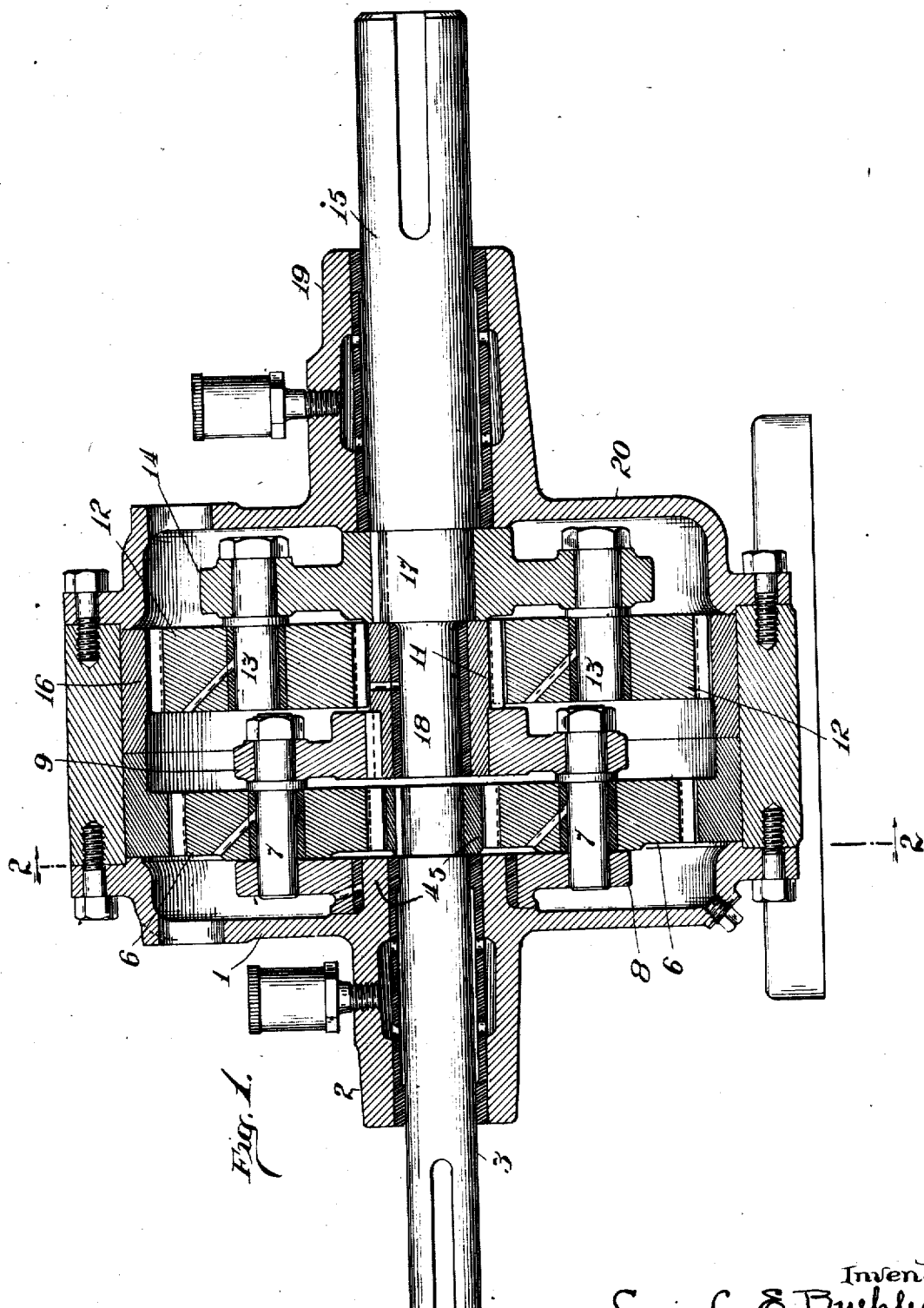

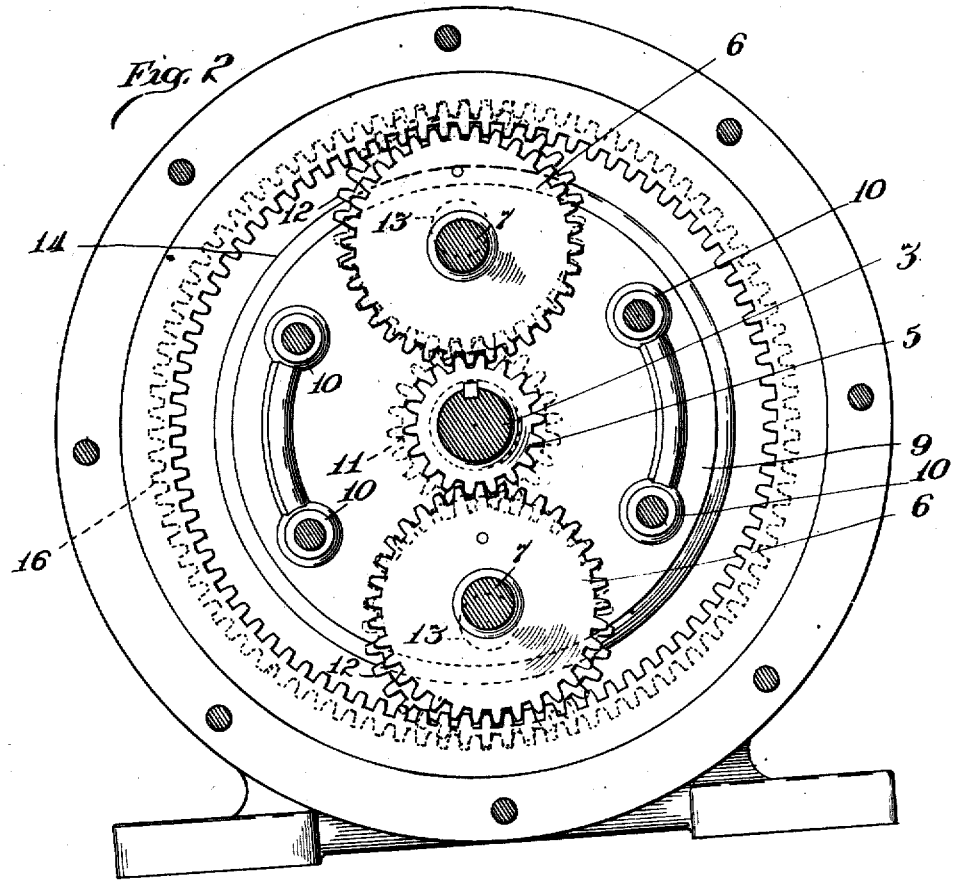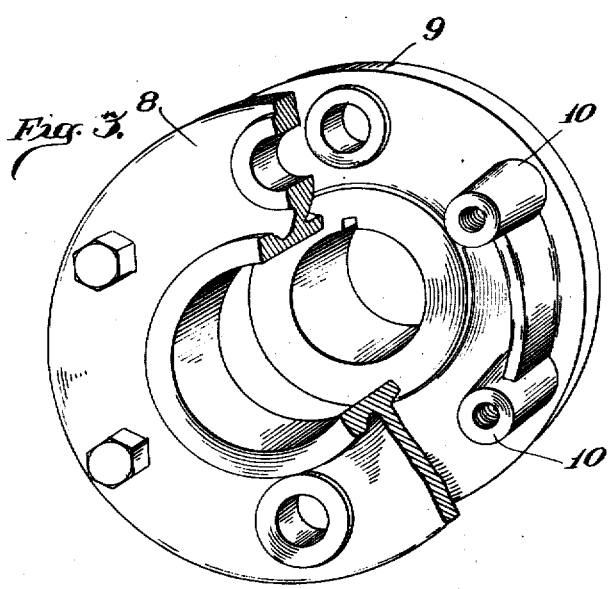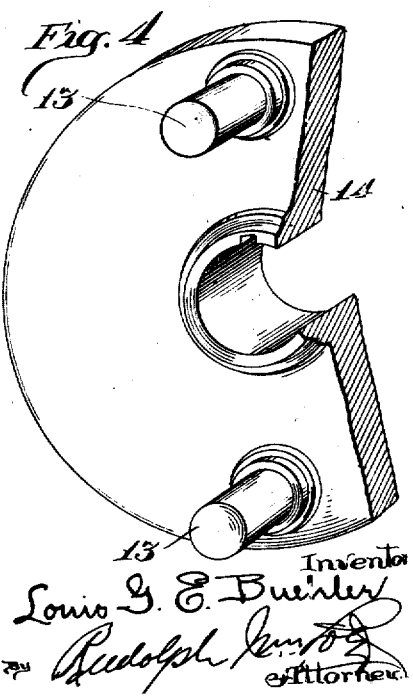

LOUIS G. E. BUEHLER, OF CHICAGO, ILLINOIS.

SPEED-REDUCING GEAR.

1,320,530.　　　　Specification of Letters Patent.　　Patented Nov. 4, 1919.

Application filed May 17, 1918. Serial No. 235,100.

*To all whom it may concern:*

Be it known that I, LOUIS G. E. BUEHLER, citizen of the United States, residing at Chicago, in the county of Cook and State of Illinois, have invented certain new and useful Improvements in Speed-Reducing Gears; and I do hereby declare the following to be a full, clear, and exact description of the invention, such as will enable others skilled in the art to which it appertains to make and use the same.

This invention has for its object to provide certain new and useful improvements in speed-reducing gears, and has for its particular object to overcome certain difficulties as hereinafter explained.

In speed-reducing gears as a general rule the high speed and low speed shafts are disposed in axial alinement and certain rotating parts of the mechanism are rotatably mounted on one or other of said shafts and rotate relatively thereto during the rotation of the said shafts. As a general rule these reducing gears are mounted in housings into which the low speed shaft extends for a considerable length and this results frequently in causing said shaft to be flexed by the strains imposed thereon and as a result of parts of the mechanism being rotatably supported upon the projecting end portion thereof. As a rule the gear sets become very hot during rotation and unless competently lubricated are apt to bind upon each other; this being particularly true when the friction becomes intense at certain points by flexing of the shaft whereby certain of the gears are thrown more or less out of proper position. In some instances it has been attempted to prevent flexing of the low-speed shaft by projecting the end of the high speed shaft into the opposed end of the low speed shaft, and this arrangement has been a source of trouble because of the difficulty of properly lubricating this bearing. One object of my invention is to overcome these difficulties.

A further object of the invention is to provide a speed-reducing gear which may be easily and quickly assembled and disassembled for purposes of inspection and repair, and which further affords easy and efficient means for effecting speed reduction of any desired ratio by adding certain gear sets where the speed reduction is desired to be increased to a material extent from an approximately usual standard.

Another object of the invention is to provide a speed-reducing gear in which certain of the gears constitute an integral part of or are closely associated and in contact with the peripheral wall of the casing or housing, and in which said housing may be water jacketed for maintaining said gears cool whereby the efficiency of the device is considerably increased.

Further objects of the invention will appear from the following specification.

In the accompanying drawings I have illustrated the preferred embodiment of the invention for effecting a speed reduction in a ratio approximating 25 to 1. In said drawings:

Figure —1— is a central longitudinal section of a speed-reducing gear constructed in accordance with the invention.

Fig. —2— is a detail transverse section of the same on the line 2—2 of Fig. —1—.

Fig. —3— is a fragmentary perspective view of two opposed gear-carrying members disposed within the gear casing.

Fig. —4— is a fragmentary perspective view of one of said members.

Referring now to said drawings, 1 indicates a housing for a speed-reducing gear which comprises two end plates between which the peripheral or circumferential wall (the latter being preferable) is securely held by means of set-screws. The plate 2 is integral with a sleeve bearing for the high speed shaft 3 and includes a portion 4 extending or projecting from the inner face of said plate. At the inner end of said shaft 3 is a spur pinion 5. This meshes with a plurality of idlers 6, preferably three, equally spaced from each other, and which are rotatably mounted upon the shafts 7, which are mounted at their ends in opposed disks 8 and 9 respectively. The disk 9 has a hub portion which is rotatable upon the portion 4 of the bearing for the shaft 3 and is rigidly secured to the disk 9 by means of projections 10 extending from one face of one of said disks to the opposed face of the other thereof, and in which bolts, passing through openings in the last-named plate, have threaded engagement. The idlers are thus carried in a rotatable frame. Said idlers also mesh with an internal gear 10<sup>a</sup> which preferably is fitted into the circumferential wall and is suitably keyed thereto to prevent rotation thereof. Thus as the shaft 3 rotates the idlers will rotate about their own axes at the same time that they travel about the axis of the shaft 3 which is coincident with the axis of the internal gear 10ª.

In the hub of the disk 9 there is keyed the shank of a spur pinion 11 which meshes with idlers 12 carried by the stud shafts 13 of a disk 14 which is keyed to the low speed shaft 15. The said idlers mesh with an internal gear 16, similar to the internal gear 10ª, but of somewhat larger pitch diameter. The low speed shaft 15 has two annularly reduced portions 17 and 18 respectively, which project into the housing and the former of which carries the disk 14 and the latter of which (being the smaller) rotates within the spur pinion 12 and its shank. It will, of course, be understood that suitable bronze bushings are used wherever required, and that in place of the ordinary bearings herein shown, roller bearings may be used. The shaft 15 is journaled in a relatively long bearing 19 integral with the end plate 20 of the housing.

In the instance illustrated the gear ratio for each set of idlers and internal gears is substantially 5 to 1, that is to say, for each five revolutions made by the high speed shaft, the frame carrying the first set of idlers will make five revolutions as will also the spur pinion 11. For each five revolutions of the spur pinion 11 the disk 14 and low speed shaft 15 will make one revolution, the gear ratio being thus 25 to 1 between the high speed and low speed shafts. This ratio may, of course, be varied as desired by varying the relative pitch diameters of the several spur pinions and internal gears employed. If, for example, the speed reduction should be desired to be in the ratio of 100 to 1 then the hub of the disk 14 would be rotatable on the low speed shaft and the same would carry another spur pinion meshing with another set of idlers, and the latter would mesh with another of the internal gears such as the gear 10ª. The last set of idlers would be mounted on stud shafts of a disk similar to the disk 14 keyed to the low speed shaft, and if the last-named added spur pinion and internal gear were made in the ratio of four revolutions of the pinion to effect one revolution of the last-mentioned disk, the entire speed reduction ratio between the high and low speed shafts would be 100 to 1. Obviously this ratio could be still further multiplied as desired by further additions of gear sets in the manner described.

It will be noted that whenever desired the gear sets may be easily taken apart and reassembled by merely removing the end plate 2 of the housing and withdrawing one gear set after the other from the latter including, of course, the internal gears. Any repairs necessary may then be effected and the parts quickly and easily re-assembled without difficulty.

The arrangement is very advantageous by reason of the fact that the second spur pinion 11 is held absolutely rigidly in axial alinement with the high speed shaft and by reason of the projection of the inner end of the low-speed shaft into the hollow spur pinion 11, said low-speed shaft is prevented from being flexed by the strains imposed thereon by the gear sets rotatably mounted thereon, where additional gear sets are employed. Furthermore, there is comparatively little relative speed rotation between the low-speed shaft and the last-named spur pinion for the reason that both of the same will rotate in the same direction.

The housing is also adapted to contain a large quantity of lubricating oil which will be carried up by the several disks and the idlers so as to thoroughly lubricate all relatively movable parts, including the bearings for the several disks.

Where the speed of the high speed shaft is unusually great, that is for example, exceeding two thousand revolutions per minute, it is preferable to mount the first set of idlers in roller bearings as will be obvious, though roller bearings may be used throughout if desired.

My said internal gear has been found to be very efficient in practice and relatively economical and noiseless.

Obviously the construction may be varied to some extent from the exact details shown in the accompanying drawings, but all such variations are included within the scope of the appended claims.

The device is suitable for many different purposes as for example, hoists or elevators, cranes and for direct transmission from high speed electric motors to low speed lathes and similar machinery, and may be adapted to all purposes of this general nature.

I claim as my invention:

1. A speed-reducing gear comprising a housing having a bearing at one end projecting into the same, a high-speed shaft journaled in said bearing, a bearing in the other end of the housing and projecting into the latter, a low-speed shaft journaled therein, a spur pinion at the inner end of the high-speed shaft, a pair of disks journaled respectively on said first-named bearing and on the inner end of the low-speed shaft, means rigidly connecting said disks with each other, a plurality of shafts spanning the space between said disks, an internal gear rigidly mounted in the housing around said disks, a plurality of idlers carried on said last-named shaft and meshing with said pinion and internal gear for effecting rotation of said disks as said high-speed shaft rotates, and gearing between said disks and the low-speed shaft.

2. A speed-reducing gear comprising a housing having a bearing at one end projecting into the same, a high-speed shaft journaled in said bearing, a bearing in the other end of the housing and projecting into the latter, a low-speed shaft journaled therein, a spur pinion at the inner end of the high-speed shaft, a pair of disks, one of which is journaled on said first-named bearing, and the other of which is mounted on the low-speed shaft, means rigidly connecting said disks with each other, a plurality of shafts spanning the space between said disks, an internal gear rigidly mounted in the housing around said disks.

3. A speed-reducing gear comprising a housing having a bearing at one end projecting into the same, a high-speed shaft journaled in said bearing, a bearing in the other end of the housing and projecting into the latter, a low-speed shaft journaled therein, a spur pinion at the inner end of the high-speed shaft, a pair of disks, one of which is journaled on said first-named bearings, means rigidly connecting said disks with each other, a plurality of shafts spanning the space between said disks, an internal gear rigidly mounted in the housing around said disks, a plurality of idlers carried on said last-named shafts and meshing with said pinion and internal gear for effecting rotation of said disks as said high-speed shaft rotates, and operative connection between the other of said disks and said low-speed shaft whereby the inner end of the latter is supported by and the shaft actuated by said disks.

4. A speed-reducing gear comprising a housing having a bearing at one end projecting into the same, a high-speed shaft journaled in said bearing, a bearing in the other end of the housing and projecting into the latter, a low-speed shaft journaled therein, a spur pinion at the inner end of the high-speed shaft, a pair of disks, a hollow spur-pinion rigid and concentric with one of said disks and receiving the inner end of the low speed shaft, a disk keyed to the latter, a plurality of stud shafts on said disk, a second internal gear rigid with the housing, and idlers on said stud-shafts meshing with said last-named internal gear and pinion.

5. A speed-reducing gear comprising a housing having a bearing at one end projecting into the same, a high-speed shaft journaled in said bearing, a bearing in the other end of the housing and projecting into the latter, a low-speed shaft journaled therein, a spur pinion at the inner end of the high-speed shaft, a pair of disks journaled respectively on said first-named bearing and on the inner end of the low-speed shaft, means rigidly connecting said disks with each other, a plurality of shafts spanning the space between said disks, an internal gear rigidly mounted in the housing around said disks, and in contact with the peripheral wall thereof, a plurality of idlers carried on said last-named shaft and meshing with said pinion and internal gear for effecting rotation of said disks as said high-speed shaft rotates, and gearing between said disks and the low-speed shaft.

6. A speed reducing gear comprising a casing having axially alined bearings in its opposite end walls, a high speed shaft journaled in one of said bearings, a low speed shaft journaled in the other of said bearings, a gear element rigid with the casing and concentric with said bearings, a pinion rigid with the high speed shaft, a plurality of idle gears meshing with said gear and said pinion, a rotatable carrier for said gears operatively associated with the low speed shaft to drive the same, and a bearing element for one end of said gear carrier rigid with the casing and concentric with and disposed adjacent the bearing for the high speed shaft.

LOUIS G. E. BUEHLER.